(12) United States Patent
Stefanidis

(10) Patent No.: US 6,900,813 B1
(45) Date of Patent: May 31, 2005

(54) METHOD AND APPARATUS FOR IMPROVED GRAPHICS RENDERING PERFORMANCE

(75) Inventor: Steve Stefanidis, Aurora (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/678,812

(22) Filed: Oct. 4, 2000

(51) Int. Cl.[7] ............................................... G09G 5/37
(52) U.S. Cl. ..................... 345/562; 345/153; 345/537; 345/538; 345/539
(58) Field of Search .............................. 345/153, 537, 345/538, 562, 539

(56) References Cited

U.S. PATENT DOCUMENTS 6,008,816 A * 12/1999 Eisler et al. ................ 345/431
6,587,112 B1 * 7/2003 Goeltzenleuchter et al. 345/532
6,597,364 B1 * 7/2003 Chiu et al. .................. 345/562

* cited by examiner

Primary Examiner—Matthew C. Bella
Assistant Examiner—Tam Tran
(74) Attorney, Agent, or Firm—Vedder, Price, Kaufman & Kammholz, P.C.

(57) ABSTRACT

A method and apparatus determines if a BLT command meets BLT override criteria. If the BLT override criteria is met, the method and apparatus performs a BLT command override and instead executes a FLIP operation instead of performing a BLT operation.

13 Claims, 5 Drawing Sheets

METHOD AND APPARATUS FOR IMPROVED GRAPHICS RENDERING PERFORMANCE

BACKGROUND OF THE INVENTION

1. Field of the Invention

The invention relates generally to methods and apparatus for rendering images for a display device, and more particularly to methods and apparatus that perform image operations based on bit length transfer (BLT) commands.

2. Description of Related Art

Graphics accelerators, also known as graphics processors, have evolved that incorporate 2D and 3D rendering engines to provide enhanced images for computers display, HDTVs, and other suitable display devices. Such rendering engines typically render images into rendering memory. The final image is then flipped into display memory or copied into display memory. As known, an application, such as a word processing program, video game, or other application, provides drawing commands to an operating system and/or a graphics processor. One type of command is called a render BLT command which is a bit, length, transfer command which essentially is a command to copy bits from one location to another, sometimes referred to as a copy command. One type of BLT command is a full screen BLT command which requires a full screen of bits to be copied into system memory, into a frame buffer, or any other suitable location to, for example, free up rendering memory. Accordingly, a BLT command requires, for example, a graphics processor to copy pixels from one memory block to another memory block. A full screen BLT operation is time consuming since it requires movement of all of the pixel values from one location to another location. Conventional graphics processors will use a portion of memory to render three dimensional images or two dimensional images, for example, and then the application will require the graphics processor to BLT the rendered image to a display memory in a frame buffer. The display memory is then read by a suitable display controller and the pixel values then are presented to a display device.

Another command often used by applications is a FLIP command which flips a rendered image from a back buffer to a front buffer, for example, by changing the display address that is to be used by a display controller. The front buffer is typically the actively viewed buffer. The 2D–3D rendering engine typically renders by drawing triangles and uses the back buffer to render the image after which time a FLIP command is used to change the display address used by display controller to read the back buffer as though it were the front or actively viewed buffer. Such a command is typically more efficient since it does not require the copying of pixel values from one memory block to another.

With high performance graphics drivers that are typically shipped with or downloaded for use with graphics processors, it is desirable to have the graphics drivers enhance the processing of image information to allow high performance games and other imaging devices to provide a fast and high quality display of images.

A problem arises with applications that may only use BLT commands. With graphics processors that provide a FLIP operation, performing a BLT operation can unnecessarily reduce the performance of the graphics processing device. Applications that require that an image be rendered into a back buffer and issue a BLT command, require the copying of pixels from the back buffer into the front buffer so that the active buffer is always the same buffer. This BLT operation is time consuming and potentially unnecessary and can drastically reduce the performance capabilities of a graphics processing device since the same buffer is always used as the rendering buffer.

The problem becomes increasingly burdensome when a dual graphics processor system or multi-graphics processor system is required to render under control of such applications. For example, with dual graphics processors, one graphics processor is typically used to render one frame whereas another graphics processor is used to render another frame. The graphics processors then output their frames alternately to a display controller which then displays the frames. This can greatly increase the performance capabilities of an image rendering system since the frame rendering is performed by a plurality of graphics processing devices. Such dual processing devices may also, instead of alternative frame rendering, may alternatively render a single line of a given frame. In any event, when the application requests that a full screen BLT operation be used, only one graphics processor in a multi-processor system is typically used at a time to do a full screen BLT. Accordingly, for full screen BLT operations, the second graphics processor may be unnecessarily idle although other rendering operations can be performed.

Accordingly, a need exists for a method and apparatus for improved storing data by image rendering processors.

BRIEF DESCRIPTION OF THE DRAWINGS

The invention will be more readily understood with reference to the following drawings wherein:

FIG. 6 is a block diagram illustrating a multi-image rendering processor apparatus employing a cross processor FLIP operation to facilitate a graphics driver selective BLT override in accordance with one embodiment of the invention.

DETAILED DESCRIPTION OF A PREFERRED EMBODIMENT OF THE INVENTION

Briefly, a method and apparatus determines if a BLT command meets BLT override criteria. If the BLT override criteria is met, the method and apparatus performs a BLT command override and instead executes a FLIP operation instead of performing a BLT operation.

In one embodiment, a single (or multiple) graphics processor system employs a graphics driver that determines whether to select a BLT override wherein the graphics driver is used to determine when a BLT command meets BLT override criteria by determining if a BLT destination surface is a primary surface, determining if a BLT source surface is a secondary surface, and determining if the BLT command is for a full screen BLT. If so, the BLT command is overridden and FLIP commands are sent to the graphics processor(s) to effect a FLIP operation in place of a BLT operation.

In another embodiment, a multi-graphics processor system is employed wherein a set of multiple buffers for one graphics processor is used by the other graphics processor to affect a cross processor FLIP operation to allow simultaneous rendering by a plurality of graphics processors. Accordingly, the method and apparatus sends FLIP commands to a plurality of graphics engines employed by a plurality of graphics processors, such that current and target buffers are used across graphics engines to facilitate dual rendering by the plurality of graphics processors in response to an application requiring a BLT command. Accordingly, unlike conventional systems, the BLT command is overridden and instead, FLIP commands are used to allow multi-graphics processor processing to occur to enhance performance.

Figure 1:
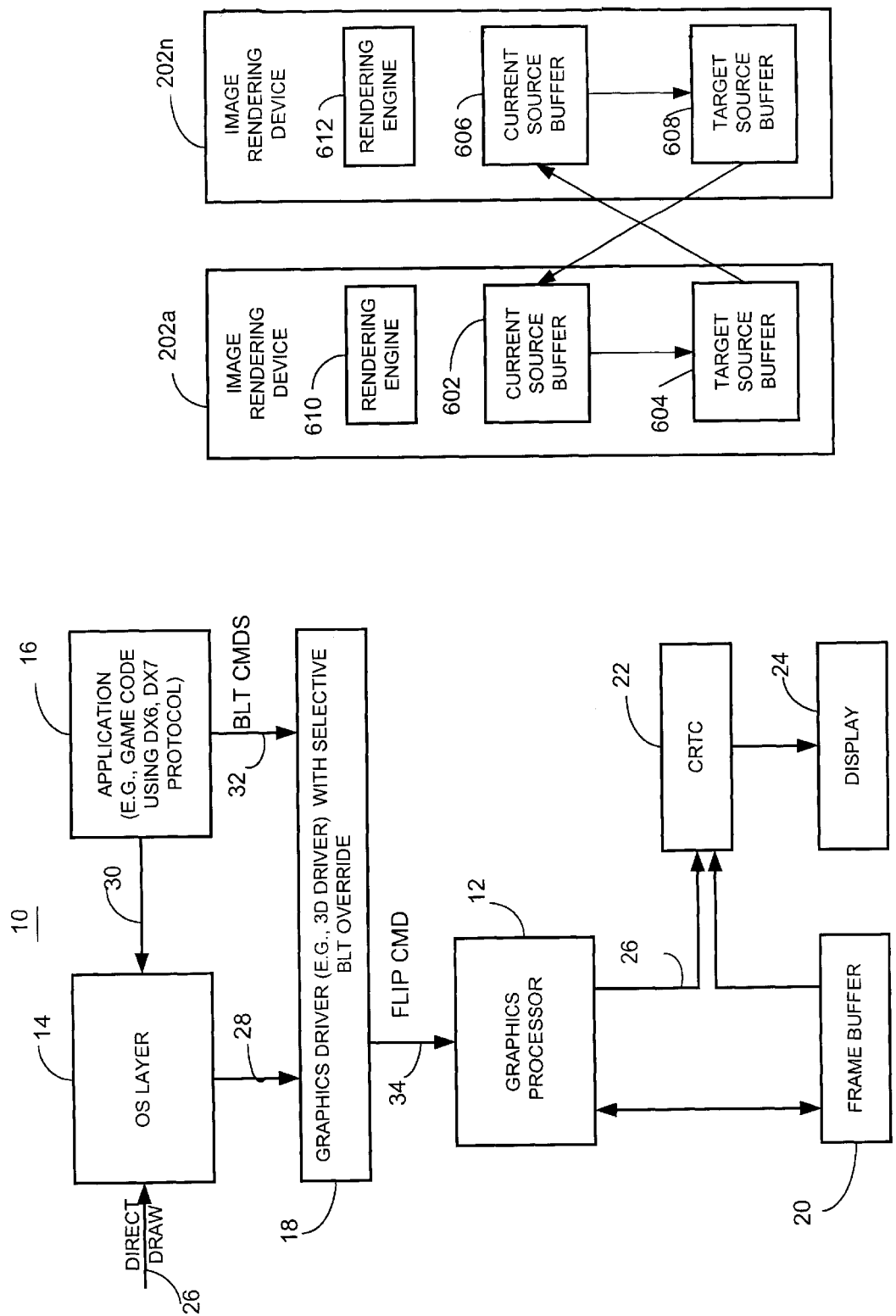
FIG. 1 is a block diagram illustrating an image rendering system having a graphics driver with selective BLT override in accordance with one embodiment of the invention.

FIG. 1 illustrates one example of an image rendering system 10, such as a computer, set top box for televisions, PDAs or any suitable handheld devices that employ a graphics processor. 12. The system 10 includes, for example, an operation system layer 14 executed by a host processor (not shown), an application 16, such as a game application or other suitable game using, for example, DX6, DX7 protocol, or any other suitable protocol. The system 10 also includes a graphics driver with selective BLT override 18, along with frame buffer 20, a CRTC 22 and display 24. As known in the art, the graphics processor 12 uses the frame buffer 20 and then the system memory or other on chip memory to render images which are then stored in the frame buffer 20 and read by a CRTC 22 and displayed on display device 24, such as an LCD panel, CRT, HDTV or other suitable display device. The graphics processor 12 may provide, for example, synchronization information 26 to the CRTC as known in the art.

The operating system layer 14 may receive direct draw commands 27 which are then passed to the graphics driver as commands 28 which are used to perform drawing operations by the graphics processor 12. The application 16, such as a word processing program, video game application, or any other suitable application, also provides calls 30 to the operating system layer 14 as known in the art and also provides drawing commands 32 such as BLT commands and other suitable drawing commands as known in the art. A BLT command may include, for example, a pointer to a beginning or source buffer memory address, the width of block in memory, the height of the block of memory and a pointer to a destination surface address, in addition to other information.

The graphics processor 12 may be any suitable graphics processor such as an ATI RAGE 128™, available, for example, from ATI Technologies Inc., Thornhill, Canada, that employs, for example, a 2D/3D rendering engine, or any other suitable drawing engine that executes FLIP commands. As used herein, a graphics processor image rendering device includes separate integrated circuits from a CPU or a combined integrated circuit containing one or more CPU's and graphics engines.

The graphics driver with selective BLT override 18, receives BLT commands 32 from the application, operating system or any other suitable source and determines if the BLT commands meets BLT override criteria. If the BLT override criteria is met, the graphics driver with selective BLT override 18 issues appropriate FLIP commands 34 to the graphics processor 12 to perform a BLT command override. The graphics processor 12 executes, for example, multi-buffering FLIP operations instead of performing a BLT operation as originally requested by the application 16. The graphics driver with selective BLT override 18 is preferably a software application stored in a storage medium, such as a CD ROM, system memory, a data base accessible, for example, through the Internet, RAM, or any other suitable medium. The medium includes memory that contains executable instructions that, when read by one or more processing devices, such as a host processor and/or a graphics processor or other suitable processing device, performs the operations as described herein. It will be recognized, however, that the graphics driver 18 may also be implemented in hardware, if desired.

Figure 3:
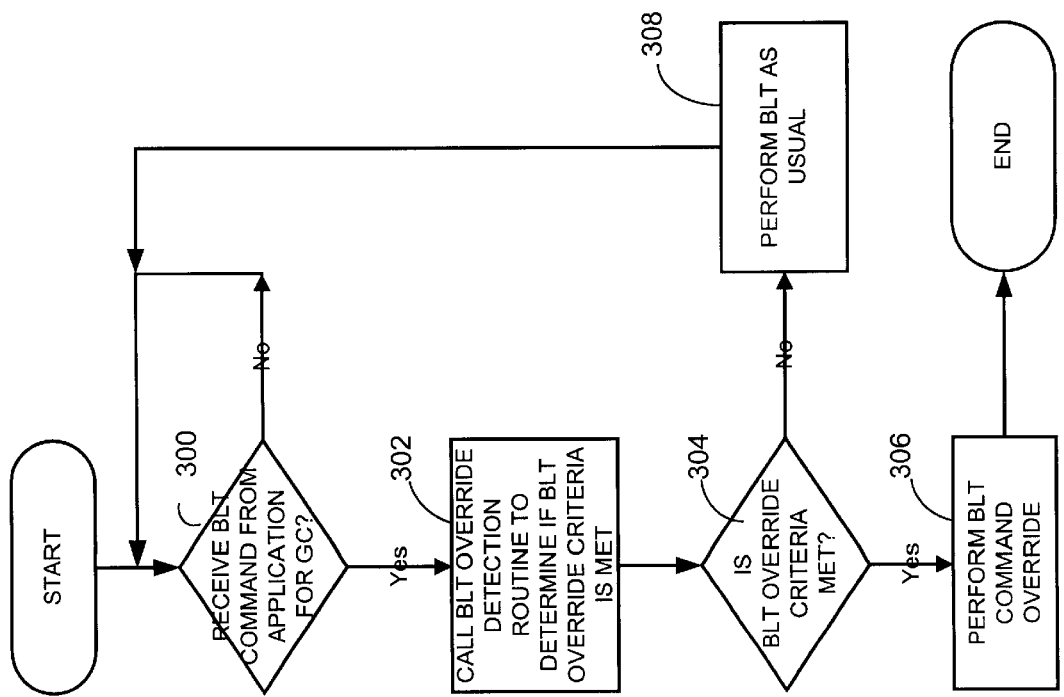
FIG. 3 is a flow chart generally illustrating a method for storing data using at least a first image rendering processor in accordance with one embodiment of the invention.

Referring to FIG. 3, a method for storing data using the image rendering processor 12, includes, for example, receiving the BLT command from application 16 for the image rendering processor as shown in block 300. This command may be received, for example, via the graphics driver 18 as executed, for example, by a host processor, or any other suitable processor (not shown). As shown in block 302, the method includes calling a BLT override detection routine, for example, stored as part of the graphics driver 18, to determine if BLT override criteria is met. Block 302 is performed on a per BLT call basis, for example a BLT override check is done on every BLT call requested by the application 16. As shown in block 304, if the BLT override criteria is met, the method includes, as shown in block 306, performing a BLT command override. However, as shown in block 304, if the BLT override criteria is not met, the method includes, as shown in block 308, performing a BLT operation as usual by passing a BLT command instead of a FLIP command 34 to the image rendering processor 12. The graphics driver 18 is executable by, for example, a host processing device and causes the host processing device to determine if the BLT command meets the BLT override criteria.

Figure 2:
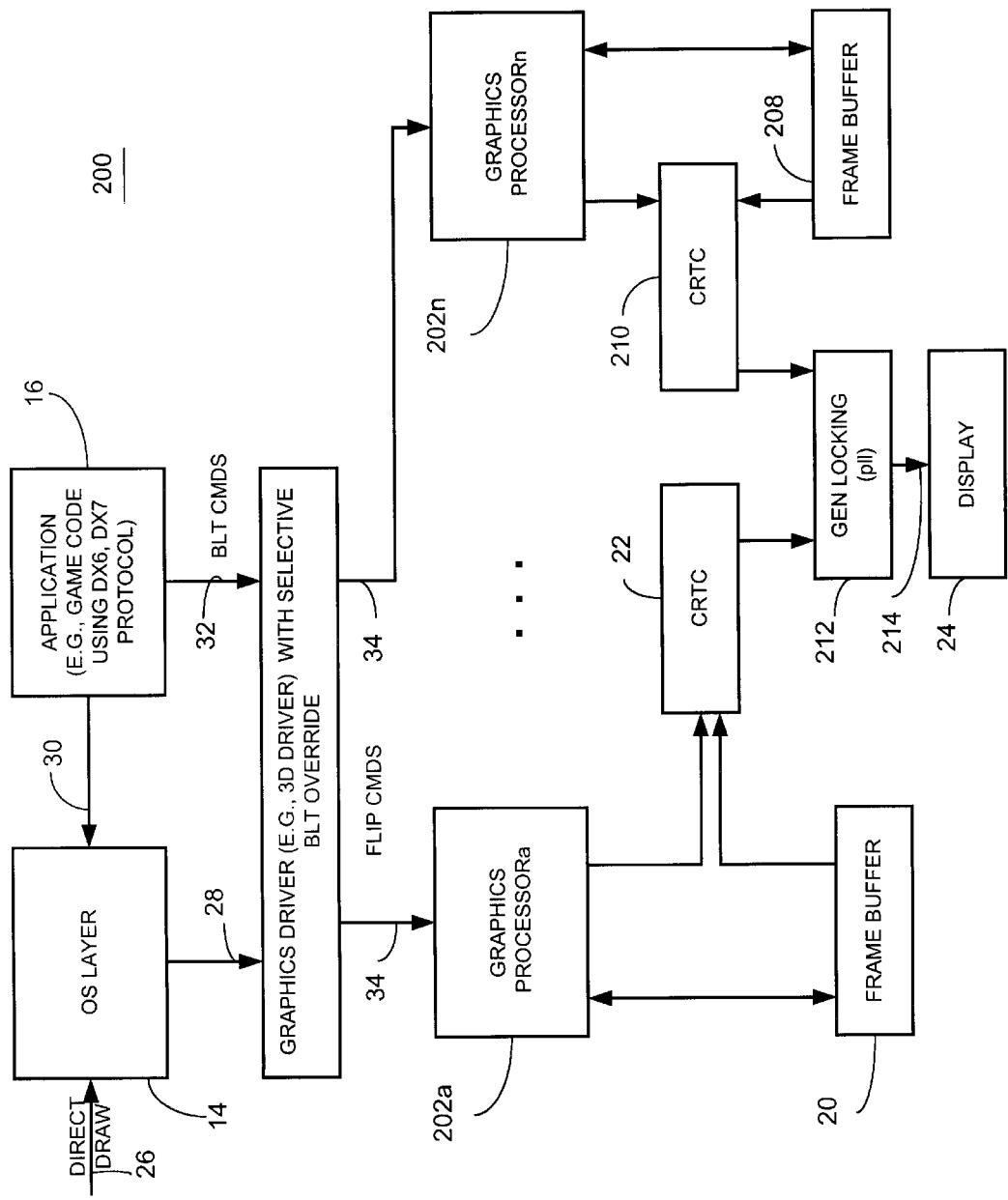
FIG. 2 is a block diagram illustrating a multi-graphics processor system employing a graphics driver with selective BLT override in accordance with one embodiment of the invention.

Referring to FIG. 2, a multi-image rendering processor system 200 is shown employing a plurality of image rendering processors indicated as graphics processor 202a through graphics processor 202n. In this embodiment, a graphics driver with selective BLT override 206 controls the graphics processors 202a–202n to perform, for example, cross image rendering processing FLIP commands wherein current and target buffers normally used for FLIP operations by each processor are used across graphics engines to facilitate dual rendering by the plurality of image rendering processors 202a–202n. As shown, the system 200 includes a second frame buffer 208 which is associated with the graphics processor 202n along with a second CRTC 210 also associated with the image rendering device 202n. A synchronization circuit 212 performs synchronization using any suitable phase lock loop circuits or any other suitable synchronization techniques to allow, for example, altering frames to be output by CRTC 210 and CRTC 22 to display device 24.

In this embodiment, the processing device, such as a host processor (not shown) determines if a BLT command meets the BLT override criteria by executing the graphics driver 206. The image rendering device 202a is operatively coupled to the processing device through one or more buses to receive the FLIP commands 34 and is also operative to perform a BLT command override if the BLT override criteria is met. In addition, the second image rendering device 202n is operatively coupled to the processing device (not shown) to receive a BLT command. The driver arbitrates on a per frame (or other basis) between the graphics processors to dispatch appropriate FLIP commands to the appropriate processor. The first and second image rendering devices 202a and 202n are operatively coupled to provide image data 214 to a common display device 224 or if desired to separate display devices.

Figure 4:
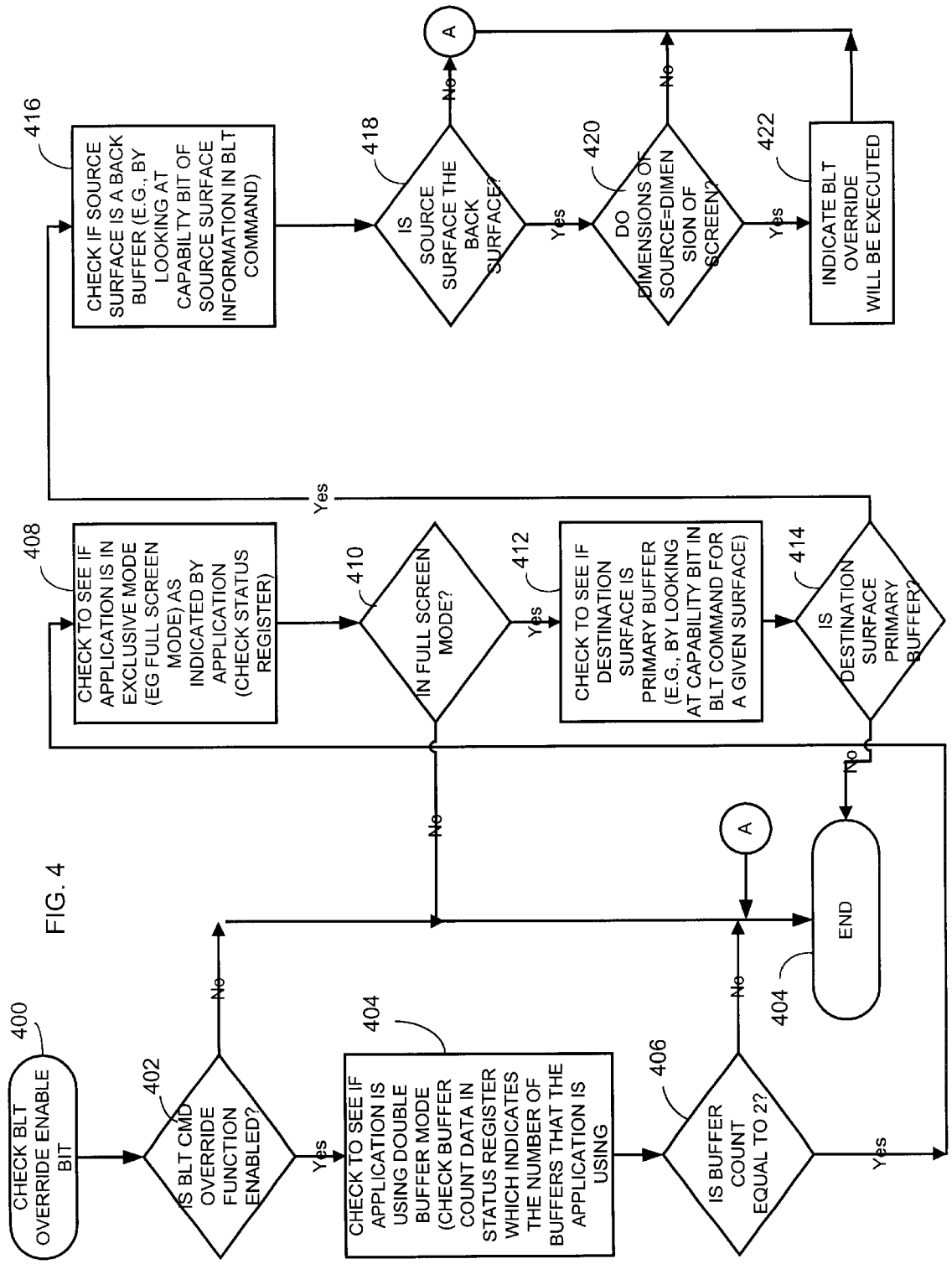
FIG. 4 is a more detailed flow chart illustrating a method for storing data using one or more image rendering processors in accordance with one embodiment of the invention.

FIG. 4 illustrates a method for storing data using one or more image rendering processors and further illustrates the operation of block 304 in FIG. 3, namely the determination if a BLT override criteria is met. As shown in block 400, the method includes checking a BLT override enable bit in a status register which may be set, for example, by the video BIOS or user to enable the performance enhancement described herein which includes overriding BLT commands as necessary. As shown in block 402, the method includes determining if the BLT command override function is enabled. If not, the BLT override criteria algorithm is not carried out, as shown in block 404. However, if the BLT command override function is enabled, the method includes, as shown in block 404, determining if an application is using a double buffer mode. This may be done, for example, by the graphics driver 18 checking the status register to determine the number of buffers that the application is using. As shown in block 406, if the buffer count is equal to two, indicating a double buffer mode, the process continues to block 408 where the method includes determining if the application is in a full screen mode. For example, the graphics driver with selective BLT override 18 checks to see if the application is in the exclusive mode as indicated by the status register updated by the application. If it is determined that the application is in full screen mode as shown in block 410, the method includes, as shown in block 412, determining if the BLT destination surface is a primary surface. For example, the method includes the graphics driver with selective BLT override 18 checking to see if the capability bit in a BLT command for a given surface indicates that the destination surface is a primary buffer. Such information is standard information with a BLT command such as Microsoft DX based applications. However the information may be obtained in any suitable manner.

As shown in block 414, the method includes determining if the destination surface is the primary buffer. If so, the method includes determining if the BLT source surface is a secondary surface, namely, if the source surface is a back buffer, as shown in block 416. For example, this may be determined by looking at the capability bit of the source surface information in the BLT command. As shown in block 418, the method includes determining if a source surface is the back surface. If so, the method includes, as shown in block 420, determining whether the dimensions of the source surface are equal to the dimensions of the screen. If so, as shown in block 422, the graphics driver with selected BLT override performs BLT command override.

Figure 5:
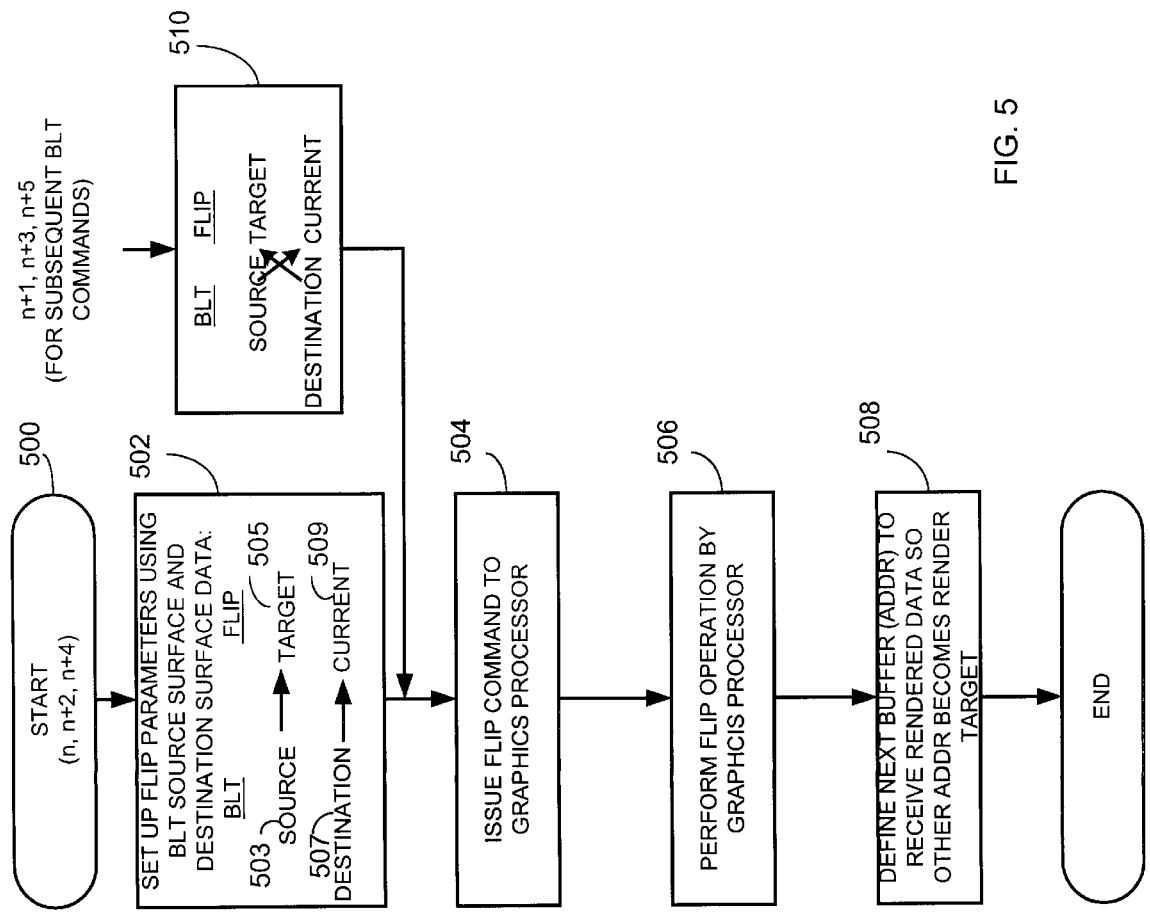
FIG. 5 is a flow chart illustrating one example of a method for storing data using one or more image rendering processors in accordance with one embodiment of the invention.

FIG. 5 illustrates operations performed by the graphics driver (i.e., host processor or other device) with selective BLT override. Performing the BLT command override includes, for example, setting up FLIP command parameters for each BLT command that is received from the application that has been determined to meet the BLT override criteria. As shown in block 500, the method begins with the receipt of the first BLT command (n) that meets the BLT override criteria and as shown in block 502 includes setting up FLIP command parameters using at least BLT source surface data, such as, for example, the BLT source address or if desired the source width and source height, and also using the BLT destination surface data such as the destination address set forth in the BLT command. This information is used prior to executing a multi-buffering FLIP operation that is used instead of performing a BLT operation in response to receiving a BLT command. As shown in block 502, the host processor or other suitable processor executing the graphics driver 18 or 206 assigns a BLT source surface 503 to a FLIP target surface 505 and assigns a BLT destination surface 507 to a FLIP current surface 509. A FLIP target surface may also be considered the back buffer. Accordingly, the requisite target surface and current surfaces for a FLIP operation are defined based on the BLT command source and destination data. As shown in block 504, the method includes issuing a multi-buffer FLIP command to a graphics processor, such as graphics processor 202a. A FLIP command is generally considered multi-buffer since is operates on two or more buffers.

As shown in block 506, the method includes performing the multi-buffering FLIP operation by the graphics processor. As shown in block 508, the method includes defining the next buffer address to receive rendered data so another address becomes the render target surface.

When the next BLT command (n+1) is received that meets the BLT override criteria, the process continues at block 510 wherein the graphics driver (i.e., host processor) reassigns the BLT source surface to the FLIP current surface and reassigns the BLT destination surface identified in the next BLT command, to the FLIP target surface. Accordingly, a multi-buffering FLIP operation is executed instead of performing a BLT operation in response to the BLT command. The second graphics processor 202n may be fed requisite FLIP commands so that for alternating, the other image rendering processor 202n also executes multi-buffering FLIP operations instead of performing BLT operation. Accordingly, a BLT command override is performed for two or more graphics processors if the BLT override criteria is met.

FIG. 6 graphically illustrates FLIP operation control to override a BLT command in accordance with one embodiment of the invention. In this example, FLIP commands are sent to a plurality of graphics engines associated with the differing graphics processors 202a–202n or image rendering devices, such that current and target buffers 602 and 604 associated with image rendering device 202a and current and target buffers 606 and 608 associated with image rendering device 202n are used across graphics engines 610 and 612, respectively, to facilitate dual rendering, simultaneously, by the plurality of image rendering devices 202a and 202n, even when a BLT command is being sent by the application 16. This occurs as follows: when image rendering device 202n renders images, it renders images in its target buffer 608. During the receipt of the FLIP command by graphics controller 202n, the graphics driver assigns the current surface 602 as the current surface for the target FLIP operation associated with graphics controller 202n. In this way, graphics controller 202a can render its image at the same time by rendering in target surface 604. The graphics driver allocates across graphics engines the current surface 606 associated with graphics controller 202n as the current surface on which to FLIP the rendered image from target surface buffer 604. At the same time, the graphics controller 202n can perform image rendering in target surface 608. Accordingly, continued rendering can occur using both of the image rendering processors 202a and 202n while each uses a current or target buffer associated with the other image rendering processor. Accordingly, a method and apparatus is described wherein a driver that is executable by a processing device causes the processing device to determine if a BLT command meets BLT override criteria. If BLT override criteria is met on a per BLT command basis, a multi-buffer FLIP operation is performed instead of a BLT operation. Where a plurality of image rendering devices are used, if desired, FLIP operations are performed using memory of differing graphics controllers to effect current image rendering operation at the same time FLIP commands are being executed when BLT commands are being sent by an application to the graphics driver with selective BLT override. This can enhance the performance of a single or multi-image rendering device system. Other advantages will be recognized by those of ordinary skill in the art.

It should be understood that the implementation of other variations and modifications of the invention in its various aspects will be apparent to those of ordinary skill in the art, and that the invention is not limited by the specific embodiments described. For example the determination of whether to override a BLT command can be preformed by the image rendering device. It is therefore contemplated to cover by the present invention, any and all modifications, variations, or equivalents that fall within the spirit and scope of the basic underlying principles disclosed and claimed herein.

What is claimed is:

1. A method for storing data using at least a first image rendering processor comprising steps of:
   determining if a BLT command meets BLT override criteria, the BLT override criteria including determining if a BLT destination surface is a primary surface, determining if the BLT source surface is a secondary surface, and determining if the BLT command is for a full screen BLT; and
   performing a BLT command override if the BLT override criteria is met wherein the step of performing the BLT command override includes executing a multi-buffering flip operation instead of performing a BLT operation in response to the BLT command.

2. The method of claim 1 wherein the step pf performing the BLT command override includes the step of setting up flip command parameters using at least BLT source surface data and BLT destination surface data prior to executing the multi-buffering flip operation instead of performing a BLT operation in response to the BLT command.

3. A method for storing data using at least a first image rendering processor comprising steps of:
   determining if a BLT command meets BLT override criteria, the BLT override criteria including determining if a BLT destination surface is a primary surface, determining if the BLT source surface is a secondary surface, and determining if the BLT command is for a full screen BLT; and
   performing a BLT command override if the BLT override criteria is met wherein the step of performing the BLT command override includes executing a multi-buffering flip operation instead of performing a BLT operation in response to the BLT command for a second image rendering processor.

4. An image rendering apparatus comprising:
   a processing device that determines if a BLT command meets BLT override criteria, the BLT override criteria including determining if a BLT destination surface is a primary surface, determining if the BLT source surface is a secondary surface, and determining if the BLT command is for a full screen BLT;
   a first image rendering device, operatively coupled to the processing device, and operative to perform a BLT command override if the BLT override criteria is met; and
   a second image rendering device operatively coupled to the processing device to receive a BLT command;
   wherein the first and second image rendering devices are operatively coupled to provide image data to at least a common display device; and
   wherein the image rendering device is operatively responsive to perform a multi-buffer flip operation in response to a determination that a BLT command meets BLT override criteria; and performs a BLT command override if the BLT override criteria is met by executing the multi-buffer flip operation.

5. The apparatus of claim 4 wherein the first image rendering device performs the BLT command override by setting up flip command parameters using at least BLT source surface data and BLT destination surface data prior to executing the multi-buffering flip operation instead of performing a BLT operation in response to the BLT command.

6. An image rendering apparatus comprising:
   a processing device that determines if a BLT command meets BLT override criteria, the BLT override criteria including determining if a BLT destination surface is a primary surface, determining if the BLT source surface is a secondary surface, and determining if the BLT command is for a full screen BLT;
   a first image rendering device, operatively coupled to the processing device, and operative to perform a BLT command override if the BLT override criteria is met; and
   a second image rendering device operatively coupled to the processing device to receive a BLT command wherein the first and second image rendering devices are operatively coupled to provide image data to at least a common display device; and
   wherein the first processing device performs the BLT command override by executing a multi-buffering flip operation instead of performing a BLT operation in response to the BLT command for the second image rendering device.

7. A storage medium comprising:
   memory containing executable instructions that when read by one or more processing devices causes the one or more processing devices to:
   determine if a BLT command meets BLT override criteria, the BLT override criteria including determining if a BLT destination surface is a primary surface, determining if the BLT source surface is a secondary surface, and determining if the BLT command is for a full screen BLT; and
   if the BLT override criteria is met, passing to an image rendering device at least one command initiating a multi-buffering flip operation to be performed by the image rendering device so that a BLT command override is performed if the BLT override criteria is met.

8. The storage medium of claim 7 wherein the memory contains executable instructions that when read by one or more processing devices causes the one or more processing devices to:
   determine if a BLT destination surface is a primary surface;
   determine if a BLT source surface is a secondary surface; and
   determine if the BLT command is for a full screen BLT.

9. The storage medium of claim 7 wherein the memory contains executable instructions that when read by one or more processing devices causes the one or more processing devices to:

determine if an application is using a double buffer mode; and determine if the application is in a full screen mode.

10. The storage medium of claim 7 wherein the memory contains executable instructions that when read by one or more processing devices causes the one or more processing devices to:

set up flip command parameters using at least a BLT source surface data and a BLT destination surface data prior to the image rendering device executing the multi-buffering flip operation instead of performing a BLT operation in response to the BLT command.

11. The storage medium of claim 7 wherein the memory contains executable instructions that when read by one or more processing devices causes the one or more processing devices to assign a BLT source surface to a flip target surface and assigning a BLT destination surface to a flip current surface.

12. The storage medium of claim 11 wherein the memory contains executable instructions that when read by one or more processing devices causes the one or more processing devices to reassign the BLT source surface to the flip current surface and reassign the BLT destination surface to the flip target surface.

13. The storage medium of claim 11 wherein the memory contains executable instructions that when read by one or more processing devices causes the one or more processing devices to:

determine, for a plurality of different image rendering devices, if a BLT command meets BLT override criteria;

if the BLT override criteria is met for a first image rendering device, passing to the first image rendering device at least one command initiating a multi-buffering flip operation to be performed by the first image rendering device so that a BLT command override is performed if the BLT override criteria is met; and if the BLT override criteria is met for a second image rendering device, passing to the second image rendering device at least one command initiating a multi-buffering flip operation to be performed by the second image rendering device so that a BLT command override is performed if the BLT override criteria is met.

* * * * *